Dec. 15, 1936.  L. E. LA BRIE  2,064,618

BRAKE

Original Filed Sept. 6, 1928

INVENTOR.
LUDGER E. LA BRIE
BY
ATTORNEY

Patented Dec. 15, 1936

2,064,618

UNITED STATES PATENT OFFICE

2,064,618

BRAKE

Ludger E. La Brie, South Bend, Ind., assignor to Bendix Brake Company, South Bend, Ind., a corporation of Illinois Original application September 6, 1928, Serial No. 304,196. Divided and this application August 30, 1933, Serial No. 687,430

14 Claims. (Cl. 188—79.5)

This invention relates to brakes, and especially to their adjustment to compensate for wear, and is illustrated as embodied in an internal expanding automobile brake of the shiftable anchorage type.

An object of the invention is to provide a simple adjustment, preferably in the form of a floating connection between the shoes, which may readily be manipulated when desired, without having first to loosen any locknuts or setscrews or the like, and yet which is firmly locked against unintended adjusting movement.

Preferably the novel locking means is in the form of a member such as a resilient plate, carried by and floating with the adjustment, and which has means such as an integral pawl which locks the adjustment.

The adjustment in its illustrated form includes a right-and-left threaded member having adjustably threaded on its ends shoe-engaging thrust parts, as for example pivots mounted in the ends of the shoes. In this case, the locking member may take the form of a resilient plate having its ends mounted on the ends of the above-mentioned pivots, and provided at its center with an integral pawl or the like engaging the threaded adjusting member.

In this arrangement, the described resilient plate is preferably mounted on the side of the shoes opposite the backing plate, thereby leaving unobstructed an opening in the backing plate through which there may be inserted a tool for turning the adjusting member. The adjusting member may be provided at its center with an enlarged collar having radial sockets for the tool, in which case the locking plate may be formed with an integral conical tooth or projection interlocking with the sockets.

The above and other objects and features of the invention, including various novel combinations of parts and desirable particular constructions, will be apparent from the following description of the illustrative embodiment shown in the accompanying drawing, in which.

Figure 1:
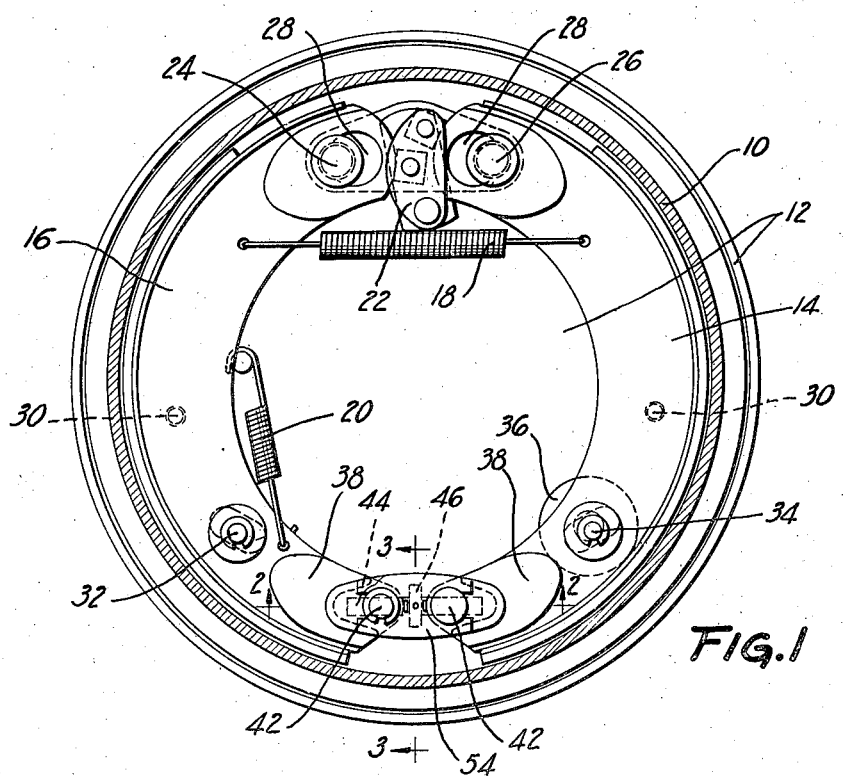
Figure 1 is a vertical section through a brake embodying the invention, just inside the head of the brake drum, and showing the brake shoes in side elevation.

The illustrated brake is more fully described, and is claimed, in my parent application No. 304,196, filed September 6, 1928, from which all of the subject-matter herein claimed is divided. It comprises generally a rotatable drum 10, at the open side of which is arranged a support such as a backing plate 12, and within which are arranged floating brake shoes 14 and 16 or equivalent friction means.

The brake is applied, against the resistance of main and auxiliary return springs 18 and 20, by means such as a floating cam lever 22. If the drum is turning clockwise when the brake is applied, shoe 16 anchors on a post 24 mounted on the backing plate; if the drum is turning counterclockwise the shoe 14 anchors on a similar post 26. Anchors 24 and 26 pass through openings 28 in the upper ends of the shoes.

The shoes may be provided with suitable steady rest pins 30 and steady rests 32 and 34 which are more fully described and which are claimed in my companion divisional application No. 687,431 filed August 30, 1933, now Patent No. 1,996,248 granted April 2, 1935. The steady rest 34 is shown provided with a radially-adjustable roller 36 engaging and positioning the shoe 14.

The present invention relates to improved and simplified adjusting means for connecting the lower ends of the shoes 14 and 16, or otherwise arranging the brake so that it may be readily adjusted to compensate for wear.

Figure 2:
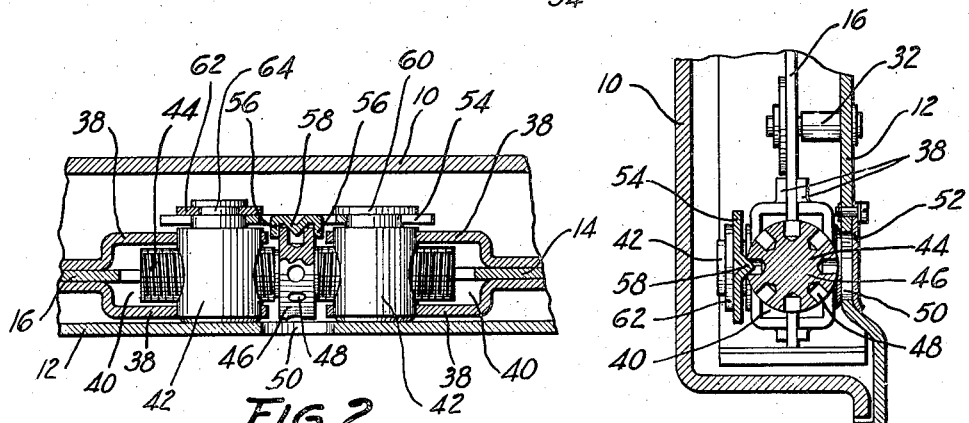
Figure 2 is a section, on the line 2—2 of Figure 1, through the adjustment.
Figure 3:
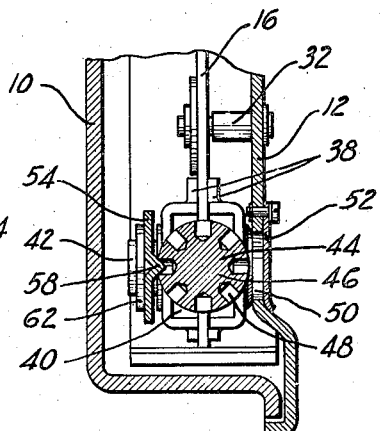
Figure 3 is a partial radial section on the line 3—3 of Figure 2.

The illustrated shoes 14 and 16 have at their lower ends pairs of stamped steel plates 38 spotwelded or otherwise secured to the opposite sides of their webs, and formed with registering grooves which (with slots cut in from the ends of the webs) form sockets 40 in the ends of the shoes. The sides of the sockets 40 are formed with openings forming bearings for cylindrical surfaces adjacent the ends of thrust members such as pivots 42, which pivots have their ends slidably resting against the backing plate 12, as shown in Figure 2.

The pivots 42 are formed with aligned transverse threaded openings into which are adjustably threaded the right-and-left threaded ends of a link or other rigid connecting member 44. The member 44 is formed centrally with a collar 46 having radial sockets 48 for engagement with a tool inserted through an opening 50 in the backing plate, to turn the adjusting member to take up for wear. The opening 50 may have a suitable cover 52. The ends of the adjusting member 44 extend into the sockets 40, but with sufficient clearance to permit the shoes to have their necessary movement on the pivots 42.

Opposite the opening 50, where it will not obstruct that opening or interfere with making the described adjustment, is arranged a novel yielding locking device. This device is shown as comprising a stamped resilient locking plate 54, having spaced integral tongues 56 embracing between them the edge of the collar 46, and having between the tongues 56 an integral conical tooth or pawl 58 yieldingly interlocking with the sockets 48.

The ends of the plate 54 are slotted to form forked ends seated in grooves in the ends of the pivots 42. For convenience of assembly, while the groove in one pivot 42 may be formed by an integral flange 60, the groove in the other is preferably formed by a C-shaped spring washer 62 slid downwardly into a locking groove 64.

The resilience of plate 54 is sufficient normally to hold the pawl 58 interlocked with one of the sockets 48, but permits this lock to be overcome without undue force in turning the collar 46 to make an adjustment of the brake.

While one illustrative embodiment has been described in detail, it is not my intention to limit the scope of the invention to that particular embodiment, or otherwise than by the terms of the appended claims.

I claim:

1. A floating brake adjustment comprising a right-and-left threaded member and thrust parts threaded on the ends thereof, and means carried by and floating with said adjustment and holding said member yieldingly against unintended turning.

2. A floating brake adjustment comprising a right-and-left threaded member and thrust parts threaded on the ends thereof, and locking means carried by and floating with said adjustment and including a pawl yieldingly interlocking with said member and holding it against unintended turning.

3. A floating brake adjustment comprising a threaded adjusting member and a plate carried by and floating with the adjustment and having a part forming a pawl yieldingly interlocking with said member.

4. A floating brake adjustment comprising a right-and-left threaded member having thrust parts threaded adjustably on its ends, and means carried by said thrust parts and yieldingly interlocking with said member.

5. A floating brake adjustment comprising a right-and-left threaded member having thrust parts threaded adjustably on its ends, and a plate having its ends carried by said thrust parts and having at its center means yieldingly interlocking with said member.

6. A brake comprising a backing plate, friction shoes carried by the plate, an adjusting member connecting the shoes, and a yielding locking means acting on said member on the side opposite the backing plate and carried by said shoes, said backing plate having an opening opposite said member through which it may be adjusted and which opening is unobstructed by the locking means.

7. A brake comprising a backing plate, friction shoes carried by the plate, a right-and-left threaded adjusting member having threaded on its ends thrust parts engaging the ends of the shoes, said member and said parts connecting the shoes, and a yielding locking means carried by said thrust parts and acting on said member on the side opposite the backing plate, said backing plate having an opening opposite said member through which it may be adjusted and which opening is unobstructed by the locking means.

8. A brake comprising a backing plate, friction shoes carried by the plate, a right-and-left threaded adjusting member having threaded on its ends thrust parts engaging the ends of the shoes, said member and said parts connecting the shoes, and a yielding locking means acting on said member on the side opposite the backing plate, said locking means including a plate having its ends mounted on the thrust parts and having at its center a pawl engaging said adjustment member, said backing plate having an opening opposite said member through which it may be adjusted and which opening is unobstructed by the locking means.

9. A brake adjustment for a pair of shoes comprising parallel pivots extending crosswise through the ends of the shoes, an adjusting member having its ends adjustably received in said pivots, and a member mounted on the ends of the pivots and paralleling said adjusting member and having means yieldingly locking said member.

10. A brake adjustment for a pair of shoes comprising parallel pivots extending crosswise through the ends of the shoes, an adjusting member having its ends adjustably received in said pivots, and a resilient plate mounted on the ends of the pivots and paralleling said member and having an integral pawl yieldingly locking said member.

11. A resilient locking plate for a brake adjustment having slotted ends and a central integral pawl tooth.

12. A resilient locking plate for a brake adjustment having ends formed with openings and having integral spaced tongues, and a central integral pawl tooth between said tongues.

13. A brake comprising a backing plate, shoes having pivots arranged with their ends slidably engaging the backing plate, an adjustment connecting the pivots, and locking means carried by the ends of the pivots opposite the backing plate and lockably engaging said adjustment.

14. A brake adjustment for a pair of shoes comprising thrust parts extending through the ends of said shoes, an adjusting member having its ends adjustably received in said thrust parts, and a member mounted on said thrust parts and paralleling said adjusting member and having means yieldingly locking said member.

LUDGER E. LA BRIE.